United States Patent [19]

Crepeau

[11] 4,021,886
[45] May 10, 1977

[54] APPARATUS FOR SCORING CRAB CLAWS AND THE LIKE

[75] Inventor: Melvin J. Crepeau, St. Petersburg, Fla.

[73] Assignee: Harry H. Bell & Sons, Inc., St. Petersburg, Fla.

[22] Filed: Oct. 24, 1975

[21] Appl. No.: 625,494

[52] U.S. Cl. .................................. 17/71; 83/6
[51] Int. Cl.² .................................. A22C 29/02
[58] Field of Search ............... 17/71, 73, 72, 48; 99/574, 577, 581; 83/6, 8, 12; 30/164.9

[56] References Cited

UNITED STATES PATENTS

| | | | |
|---|---|---|---|
| 2,525,245 | 10/1950 | Stroeve | 83/6 X |
| 3,071,802 | 1/1963 | Gambardella | 17/71 |
| 3,232,298 | 2/1966 | Tomlinson | 83/8 X |
| 3,555,595 | 1/1971 | Tolley | 17/71 |
| 3,751,766 | 8/1973 | Jonsson | 17/71 |
| 3,874,259 | 4/1975 | Chambos et al. | 83/12 X |

Primary Examiner—Louis G. Mancene
Assistant Examiner—James D. Hamilton
Attorney, Agent, or Firm—Michael, Best & Friedrich

[57] ABSTRACT

An apparatus for scoring unshelled crab claws to facilitate the removal of a portion of the shell and expose the meat including a frame rotatably carrying a pair of opposed jaws which clampingly hold a crab claw and rotate it against a camming surface of a depth gauge located adjacent a cutter, such as the blade of a standard meat cutting band saw. As the crab claw is rotated, the saw blade cuts a circumferential score through the shell. The frame is tiltable towards the cutter for scoring and away from the cutter for loading and unloading a crab claw into and from the jaws. A switch mounted on the frame energizes an electrical motor drivingly connected to the jaws as the frame is tilted towards the scoring position and de-energizes the motor as the frame is tilted toward the loading or unloading position, thereby providing automatic on-off rotation of the jaws.

17 Claims, 5 Drawing Figures

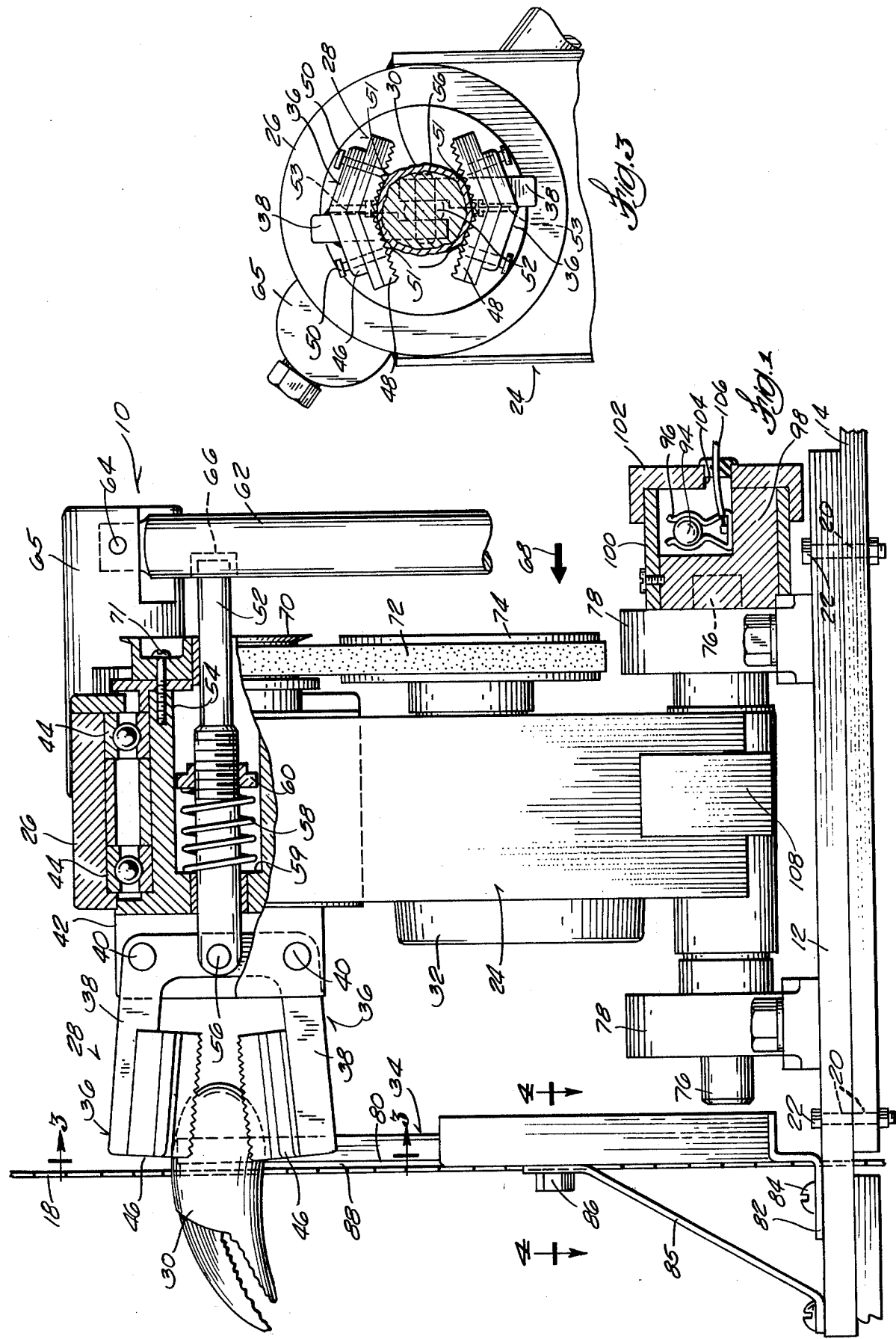

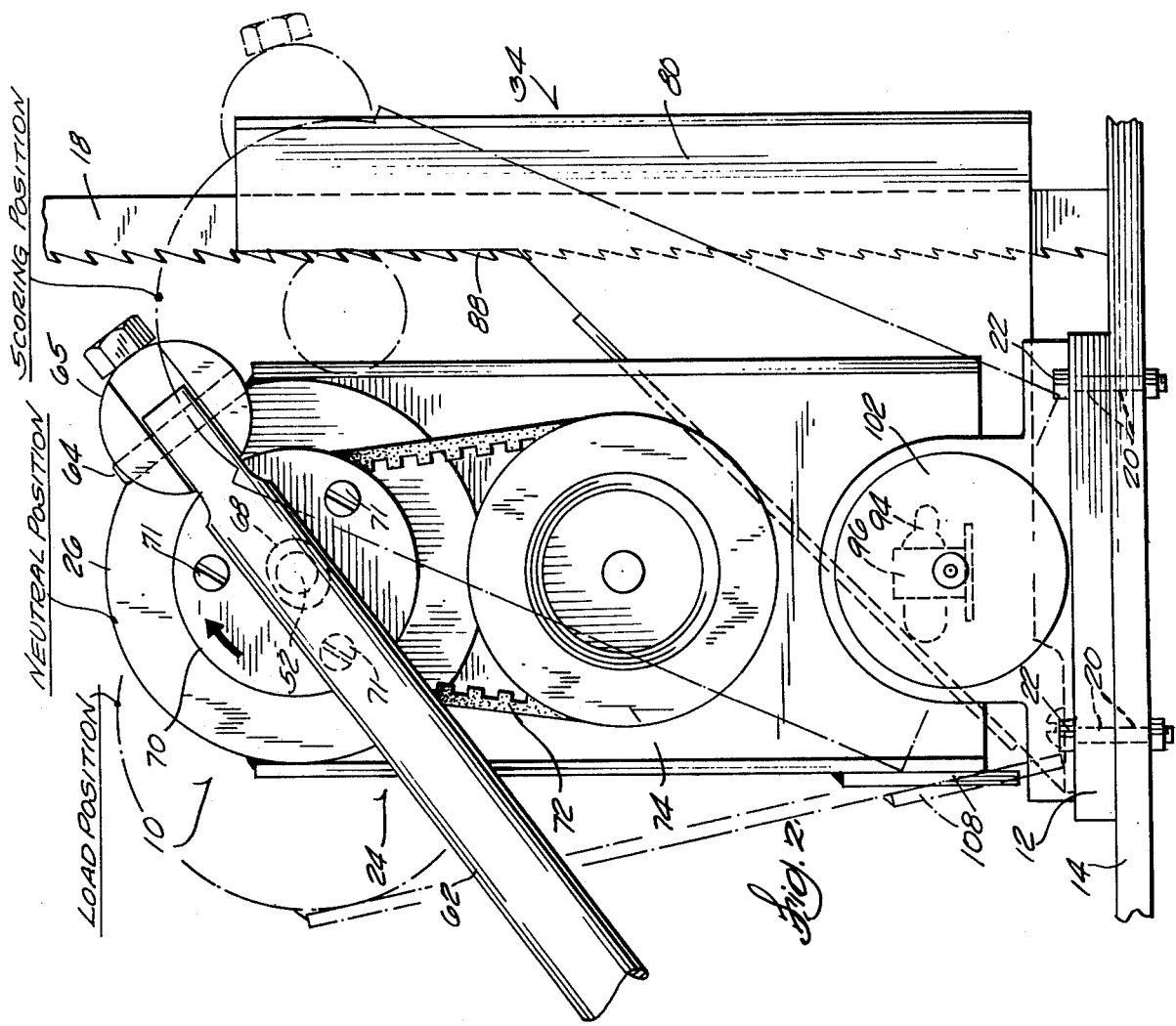
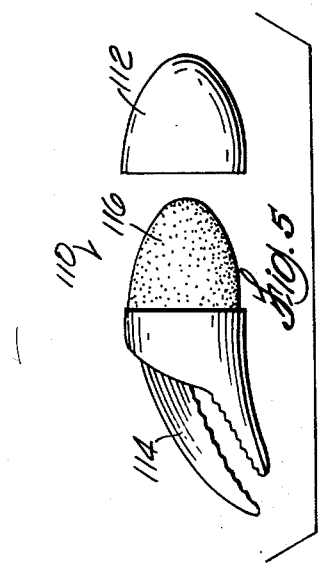
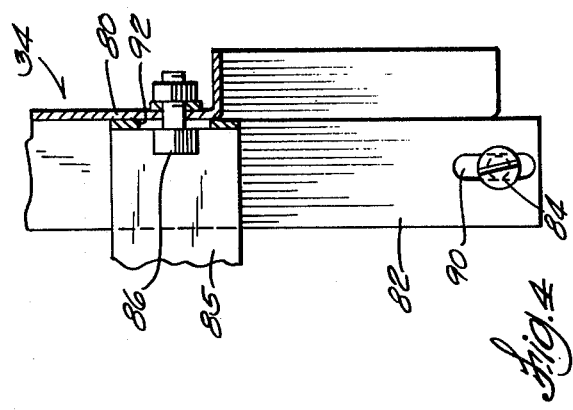

APPARATUS FOR SCORING CRAB CLAWS AND THE LIKE

BACKGROUND OF THE INVENTION

This invention relates to scoring the shell of shell fish to facilitate the removal of the shell and, more particularly, to apparatus for scoring the shell of a crab claw or the like.

The claws of so-called Snow Crab are processed for later use as a food by cooking and freezing them while still in the shell. The claws are then served as so-called "cocktail claws" after the shell covering the main body has been removed to expose the meat. In one typical process for removing the shell, a peripheral cut or score is made through the shell while the claw is still frozen, the claw soaked in hot water and the end portion of the shell opposite to the pincers is then slipped off to expose the meat. For best results, the score in the shell should be as smooth as possible in order to minimize jagged edges which might cut the consumer's lips and should extend only through the shell so as to prevent damage to the meat.

Heretofore, a manual procedure usually has been used to score unshelled claws of Snow Crab. That is, the opposite ends of the claw are held by hand and are manually rotated in a trough-like device including a groove through which a circular saw blade protrudes. The claws of a Snow Crab are relatively very small and this operation can be quite dangerous because of the close proximity of the operator's fingers to the saw blade. Oftentimes an irregular cut is produced because the operator must "eyeball" the cut during rotation in order to match up the final cut with the starting point.

The claws of Alaskan King Crab are somewhat larger; however, the shell is quite brittle and is covered with numerous lumps. Consequently, it is more difficult to hold and properly rotate by hand to obtain the desired scoring. Furthermore, the lumps require a larger portion of the saw blade to be exposed in order to insure that the score is made completely through the cut, creating an even more hazardous condition for the operator.

SUMMARY OF THE INVENTION

A principal object of the invetion is to provide an improved apparatus for forming a score of uniform depth in the shell of crab claws and the like with a minimum safety risk to the operator.

Another principal object of the invention is to provide such an apparatus which is adaptable for scoring a wide variety of crab claws and is capable of increased rates of production.

A further principal object of the invention is to provide such an apparatus which is readly adapted for use in conjuction with a convetional meat cutting band saw.

Other objects, aspects and advantages of the invention will become apparent upon reading the following detailed description from the drawings and the appended claims.

The apparatus provided by the invention includes a cutter for forming a score through the shell of the crab claw, a frame, and a gripper unit for receiving and releasably holding a crab claw supported on the frame for rotation relative to the cutter, and a motive means, such as an electrical motor, for rotating the gripping unit so that the crab claw is rotated while being cut by the cutter and a circumferential score is made through the shell. The apparatus also has a depth gauge including a camming surface which is slidably engaged by the outer surface of the claw as it is being rotated and which is located such that, when the claw is engaged by the cutter by moving the gripper unit toward the cutter or vice versa, the outer surface of the claw rotatably rides against the camming surface and a cut or score of a predetermined depth is thereby made in the shell.

In a preferred embodiment, the cutter is stationary and the frame is pivotally mounted on a stationary base for pivotal movement so that the gripper unit can be pivoted or tilted towards the cutter for scoring and pivoted or tilted away from the cutter to a retracted position for loading and unloading a crab claw into the gripper unit. In this embodiment, the pivotal portion of the apparatus preferably is weight balanced so that the claw is gravity biased into the camming surface of the depth gauge and a cut of uniform depth is made in the claw irrespective of its cross sectional shape. Switch means, which is operable in response to the pivotal or tilting movement of the frame to energize the motor as the frame is moved towards the scoring position and to de-energize the motor as the frame is moved toward the retracted position, can be included to provide an automatic on-off rotation of the gripper unit.

BRIEF DESCRIPTION OF THE DRAWINGS

FIG. 1 is a front side elevation view, partially sectioned, of a crab claw scoring apparatus embodying various of the features of the invention.

FIG. 2 is an end elevation view of apparatus shown in FIG. 1.

FIG. 3 is a sectional view taken along the line 3—3 in FIG. 1.

FIG. 4 is a sectional view taken along the line 4—4 in FIG. 1.

FIG. 5 is a side view of a crab claw after it has been scored and a portion of the shell removed.

DESCRIPTION OF THE PREFERRED EMBODIMENTS

Illustrated in the drawings is a crab claw scoring device which is readily adaptable for use with a standard meat cutting band saw commonly found as part of the existing equipment in most seafood processing plants and larger restaurants. However, it should be understood that the device can be constructed as a complete unit including an integral cutter means.

Referring to FIGS. 1 and 2, the device has a stationary base plate 12 which can be removably attached to the table 14 (shown fragmentarily) of a standard meat cutting band saw including an endless band saw blade 18. For instance, a plurality of holes 20 can be drilled through the band saw table 14 for receiving mounting bolts 22 which are used to removably fasten the base 12 to the table 14. With this arrangement, the device 10 can be conveniently attached or removed from the band saw as the need arises, permitting the band saw to be used for other purposes.

The device 10 includes a support frame 24 swingably or tiltably mounted on the base plate 12, a housing 26 mounted on the upper portion of the frame 24, and a gripper unit 28 rotatably carried by the housing for receiving and releasably holding the body portion of an unshelled crab claw 30. The device 10 also includes a motive means, such as an electrical motor 32, supported on the frame 24 and drivingly connected to the gripper unit 28 for rotating it relative to the band saw blade 18 so that a peripheral or circumferential cut or score can be made thereby in the crab claw shell. Mounted on the base plate 12 is a depth gauge 34 located in close proximity to the band saw blade 18 and arranged to control the depth of the cut made by the band saw blade as explained hereinafter.

More specifically, the gripper unit 28 includes a pair of opposed jaws 36, each having a L-shaped arm 38 which is of a bell crank configuration and is mounted for pivotal movement, such as by a pin 40, on one end of a spindle 42 which in turn is rotatably supported by a pair of axiallyspaced bearings 44 carried by the housing 26. Carried on the outer end of each arm 38 is a generally V-shaped support member 46. Fastened to the inner surface of each support member 46 for frictionally gripping the outer surface of the crab claw shell is a pad 48 having a roughened outer surface. The pads 48 preferably are made from a material including an outer layer of resilient material having a roughened outer surface, such as a conventional conveyor belt material used for conveying blocks of ice or similar smooth surfaced articles up an incline. For instance, a conveyor belt material having a canvas backing and outer layer of neoprene rubber can be used.

In order to further increase the gripping action provided by the jaws 36, one or more bolts or screws 50 having a pointed outer end 51 which bites into the outer surface of the crab shell when the jaws are in a gripping position (as shown in FIG. 3), can be threaded through each support member 46 and pad 48. The gripping action provided by the pointed screws 50 can be adjusted by screwing them in deeper or unscrewing them as required for claws of different sizes and shapes. The pads 48 preferably are removably fastened to the support members, such as by a pair of axially spaced screws 53 (one shown in FIG. 3) located on the centerline of the Vee, so they can be conveniently removed and replaced as required upon becoming worn during use.

The jaws 36 are pivoted about the pivot axis provided by the pins 40 between an open position where the end portion of the body of the claw opposite to the pincers can be installed therebetween and a closed position where the pads 48 firmly grip the outer surface of the claw as shown in FIGS. 1 and 3. Provided for this purpose is an elongated actuator rod 52 which is slidably received in and extends through an axially extending bore 54 in the spindle 42. One end of the actuator rod is pivotally connected to the inner end of the jaw arms 38 by a pin 56 and the other end extends outwardly beyond the opposite end of the spindle 42. As viewed in FIG. 1, axial movement of the actuator rod 52 to the left relative to the spindle 42 opens the jaws 36 and axial movement to the right closes the jaws 36. In FIG. 1, the actuator rod is shown in the position where the jaws are gripping a claw.

Disposed inside the spindle bore 54 and encircling the actuator rod 52 is a coil spring 58 with one end bearing against an internal shoulder 59 provided in the bore 54 and the other end bearing against a collar 60 threaded onto the actuator rod 52. The spring 58 urges the actuator rod 52 to the right as viewed in FIG. 1 and thereby biases the jaw pads 48 into firm clamping engagement with the crab claw 30. With this arrangement, the jaws are capable of providing the desired clamping action for crab claws having a wide variety of cross sectional shapes and sizes. The gripping or clamping tension provided by the jaws can be adjusted by turning the collar 60 either clockwise to increase the tension or counterclockwise to reduce the tension.

The jaws 36 are opened for loading a crab claw by a handle 62 which is pivotally mounted by a pin 64 on a support member 65 which in turn is fixably attached to and extends from the housing 26. The handle 62 has a recess 66 which slidably and rotatably receives the extended end of the actuator rod 52. As the handle 62 is pivoted towards the actuator rod 52 (i.e., in the direction of arrow 68 in FIG. 1), the outer end of the actuator rod 52 is engaged by the bottom wall of the handle recess 66 and continued movement of the handle 62 moves the actuator rod to the left causing the jaws to be pivoted to the open position as described above. After the body of the crab claw is inserted between the open jaws, the handle 62 is released and the spring 58 returns the actuator rod 52 toward the closed position, thereby causing the jaws 36 to firmly clamp the crab claw in an extended position ready for scoring by the saw blade 18 as shown in FIG. 1.

A pulley 70 is fixedly attached to the end of the spindle 42 opposite to the jaws 36, such as by a plurality of screws 71. The pulley 70 is driven by the motor 32 to rotate the spindle 42, and thus the jaws and the crab claw held thereby, via a lugged timing belt 72 and a drive pulley 74 on the motor. Thelugged timing belt 72 provides a positive drive of the pulley 70 without slippage as the claw is rotated during scoring. In the specific construction illustrated, the spindle 42 is rotated clockwise as viewed in FIG. 2.

As mentioned above, the frame 24 preferably is swingably or tiltably mounted on the base plate 12. This permits the jaws 36 to be moved back and forth between a cutting or scoring position (i.e., the right hand dashed line position in FIG. 2) where the band saw blade 18 can cut into the crab claw shell and a retracted or loading position (i.e., the left hand dashed line position in FIG. 2) where the jaws are spaced a safe distance from the band saw blade 18 for loading and unloading a crab claw. Provided for this purpose is a shaft 76 which is mounted on the lower end of the frame 24 and is pivotally supported in a pair of bearing or pillow blocks 78 mounted on the base plate 12. In FIG. 2, the solid lines illustrate the vertical or neutral position of the unit.

The depth gauge 34 includes a vertical plate 80 which is located beside and extends generally parallel to the travel path of the band saw blade 18 and a bottom flange 82 which is fastened to the base plate 12 by one or more bolts 84. The depth gauge 34 is additionally supported by a support bracket 85 fastened at one end to the vertical plate 80 by a bolt 86 and at the other end to the base plate 12. The vertical plate 80 has a vertically extending edge 88 which is located beside the band saw blade 18 and serves as a camming surface against which the outer surface of the crab claw rides when the frame 24 is tilted forwardly to the scoring position. The depth gauge 34 is positioned relative to the band saw blade 18 such that the camming edge 88 is located rearwardly from the outer extremity of the cutting teeth of the saw blades 18 at a distance where the blade will cut only through the shell as the crab claw is rotated against the camming surface.

As shown in FIG. 4, the mounting hole 90 in the bottom flange 82 of the depth gauge 34 and the upper mounting hole 92 in the support bracket 85 are slotted so that the depth gauge 34 can be moved relative to the band saw blade 18. This permits adjustment of the depth of cut made by the saw blade as required for different varieties andor sizes of crab claws being scored.

The pivotal portion of the device 10 preferably is weight balanced with respect to the pivot axis provided by the shaft 76 so that the outer surface of the crab claw is lightly biased or cammed by gravity into engagement with the camming surface 88 when the frame 24 is tilted forwardly to the scoring position. With this arrangement, the outer surface of the crab claw is maintained in engagement with the camming edge as it is rotated by the jaws, thereby providing a cut of uniform depth irrespective of the cross sectional shape of the claw. That is, the outer contour of the crab claw, which is usually more or less eliptical, is followed and the band saw blade 18 cuts only through the shell and does not cut into the meat. The camming edge 88 preferably should be relatively narrow to minimize the area of contact by the crab claw and thereby minimize the offsetting effect that any lumps or other irregularities on the shell surface might have on the depth of the cut made by the saw blade. In the construction illustrated, this weight balancing is accomplished by locating the center of mass of the pivotal portion of the unit above the pivot axis provided by the shaft 76 and the unit is tilted back and forth across a vertical plane intersecting the centerlines of the spindle 42 and the shaft 76 when the unit is in the neutral position illustrated by the solid lines in FIG. 2. Thus, when the unit is in the retracted or loading position, it cannot tilt forwardly toward the scoring position by its own weight.

Energization of the electrical motor 32 preferably is controlled by a switching means which is responsive to the tilting movement of the frame to de-energize the motor when the frame is tilted from the scoring position towards the retracted position and to energize the motor when the frame is tilted to the scoring position. While various suitable switching means can be used, in the specific construction illustrated, such switching means includes the conventional mercury-type switch 94 held in a spring clip 96 which is mounted on a block 98 which in turn is fixedly attached to one end of the shaft 76. The switch 94 is electrically connected to the motor 32 through a suitable circuitry arrangement (not shown) whereby the power circuit to the motor is opened and closed when the switch is respectively actuated to the open and closed positions as the mercury therein is displaced during rotation of the shaft 76. The switch 94 is enclosed in a substantially moisture proof housing including a tubular body 100 attached to the block 98 and an end cap 102 having a central aperture 104 through which the electrical leads 106 of the switch 94 extend. The aperture 104 is sealed with a moisture proof material, such as a silicone rubber sealing material.

In operation, the operator grasps the handle 62 and tilts the frame 24 toward him to the retracted or loading position, i.e., counterclockwise as viewed in FIG. 2 until a stop 108 mounted on the lower end of the frame engages the base plate 12. The handle 62 is then pivoted in the direction of the arrow 68 in FIG. 1 to open the jaws 36. A precooked, unshelled crab claw is placed between the jaws while still frozen with the pincers protruding outwardly and the approximate center of the claw body located in alignment with the band saw blade 18. The handle 62 is then released and the spring 58 moves the jaws 36 into firm clamping engagement with the claw body.

While still holding the handle 62, the operator tilts the frame 24 toward the operating band saw blade 18 until the outer surface of the claw engages the camming surface 88 of the depth gauge 34. As the frame 24 is being tilted toward this scoring position, the switch 94 is actuated to energize the motor 32 and the jaws 36 start rotating. The rotating crab claw rides against the camming edge 88 and a cut or score is made through the shell by the band saw blade 18. The weight balance of the pivotal portion of the unit biases the claw body lightly against the camming surface 88 and, upon one complete rotation, a smooth edged and straight peripheral or circumferential score is made in the shell.

The frame 24 is then tilted with the handle 62 to the starting or retracted position, during which movement the switch 94 is actuated to the open position and the motor is de-energized to stop rotation of the jaws 36. The handle 62 is then pivoted in the direction of 68 in FIG. 1 to open the jaws and the scored crab claw drops into a suitable container (not shown) located beneath the jaws 36. Another crab claw is loaded into the jaws as described above and the cycle repeated.

The scored crab claw 110 is then thawed by soaking in hot water, heating in an oven, etc. and the portion of the shell 112 opposite to the pincers 114 is slipped off to expose the meat 116 as shown in FIG. 5. The resulting "cocktail claw" can be eaten by holding with the pincers 114.

In the preferred embodiment, the motor 32 is operated at approximately 30 RPM and, with allowance for loading, a cycle can be completed in about 3 seconds which means it is possible to process about 20 claws per minute.

It is within the scope of the invention to make the frame stationary and the cutter blade movable relative to the frame and the depth gauge. In this case, a suitable adjustable stop is provided for properly positioning the cutter blade relative to the camming edge of the depth gauge as the cutting blade is moved to the scoring position so that a cut of the desired depth is obtained. Operation of the motor can be controlled by a suitable switch means to shut off the motor and stop rotation of the jaws for loading and unloading a claw. For example, a conventional on-off switch can be conveniently mounted on the gripping portion of the handle.

From foregoing description of the preferred embodiments of the invention, one skilled in the art can easily ascertain the essential features of the invention, and without departing from the spirit and scope thereof, make various changes and modifications to adapt it to various uses.

I claim:

1. An apparatus for scoring the shell of an unshelled crab claw or the like comprising, in combination:
   cutter means for cutting through the crab claw shell;
   a frame;
   gripping means rotatably supported on said frame for receiving one end of a crab claw and releasably holding the crab claw in a transversely extended position relative to said cutter means;
   means for moving one of said cutter means and said frame relative to the other between a retracted position where a crab claw held in said gripping means is spaced from said cutter means and a scoring position where said cutter means engages the crab claw shell and makes a cut therein, means for rotating said gripping means relative to said cutter means, and depth gauge means including a camming surface which is slidably engageable by the outer surface of the crab claw held in said gripping means and is located such that, when said one of said cutter means and said frame is moved to said scoring position and said gripping means is being rotated by said rotating means, the outer surface of the crab claw rotatably rides against said camming surface and a continuous circumferential cut of predetermined depth is made through the crab claw shell by said cutter means.

2. An apparatus according to claim 1 wherein
said cutter means is stationary; and
said frame is mounted on a stationary base for pivotal movement about an axis whereby said gripping means can be pivoted relative to said cutter means between said retracted and scoring positions.

3. An apparatus according to claim 2 wherein
said rotating means comprises and electrical motor drivingly connected to said gripping means; and
said device further includes switch means operatively connected to said motor and operable, in response to pivotal movement of said frame between said retracted and scoring positions, to de-energize said motor when said gripping means is moved from said scoring position toward said retracted position and to energize said motor when said gripping means is moved from said retracted position toward said scoring position.

4. An apparatus according to claim 2 wherein
said gripping means includes a pair of opposed jaws mounted on a spindle for common rotation therewith and for pivotal movement between an open position where one end portion of the crab claw can be inserted therebetween and a closed position where said jaws clampingly grip the crab claw, and
said spindle is rotatably carried by said frame and is drivingly connected to said rotating means.

5. An apparatus according to claim 4 including biasing means for urging said jaws toward said closed position.

6. An apparatus according to claim 5 wherein said jaw biasing means includes
actuator rod means slidably carried by said spindle for axial movement relative to said spindle;
means pivotally mounting said jaws on said actuator rod means so that, in response to axial movement of said actuator rod means relative to said spindle in one direction, said jaws are moved toward said open position and, in response to axial movement of said actuator rod means relative to said spindle in the opposite direction, said jaws are moved to said closed position; and
spring means carried by said spindle for urging said actuator rod means in said opposite direction.

7. An apparatus according to claim 6 including
a handle pivotally supported from said frame for movement relative to said actuator rod means between a loading position where said handle operatively engages said actuator rod means and moves said actuator rod means axially in said one direction against the biasing force of said spring means to thereby move said jaws to said open position and a clamping position where said actuator rod means is free to be moved axially in said opposite direction by said spring means to thereby move said jaws toward said closed position.

8. An apparatus according to claim 5 wherein
said restraining means includes a pad of resilient material having a roughened inner surface adapted to frictionally grip the outer surface of the crab claw shell when said jaws are in said closed position.

9. An apparatus according to claim 8 wherein
said restraining means further includes at least one pointed member which extends beyond said pad inner surface and bites into the crab claw shell when said jaws are in said closed position.

10. An apparatus according to claim 4 wherein
each of said jaws includes means for restraining rotational movement of the claw relative to said cutter means during cutting.

11. An apparatus according to claim 2 wherein
said cutter means is a band saw having a cutting blade; and
said depth gauge means includes
a plate member having an edge extending generally parallel to and in close proximity to the travel path of said cutting blade to serve as said camming surface, and means for adjustably mounting said plate member on said base so that the position of said camming edge relative to the cutting edge of said cutting blade can be varied to vary the depth of the cut made in the crab claw by said cutting blade.

12. An apparatus according to claim 2 including
means for lightly biasing the crab claw held by said gripping means into engagement with said camming surface when said gripping means is moved to said scoring position.

13. An apparatus according to claim 12 wherein
said claw biasing means comprises for weight balancing said frame relative to said pivot axis so that the claw is biased by gravity into said camming surface when said gripping means is in said scoring position.

14. An apparatus for scoring the shell of a frozen, precooked crab claw or the like so that a portion of the shell can thereafter be slipped off to expose the meat comprising, in combination:
a stationary band saw including a cutting blade,
a stationary base located adjacent said cutting blade;
a frame;
a spindle rotatably carried by said frame;
a pair of opposed jaws mounted on said spindle for common rotation therewith and for pivotal movement between an open position where one end of the crab claw can be inserted therebetween and a closed position where said jaws clampingly grip the crab claw and hold it in a transversely extended position relative to said cutting blade;
an electrical motor supported from said frame and drivingly connected to said spindle for rotating said jaws;
means pivotally mounting said frame on said base for pivotal movement about an axis relative to said cutting blade between a retracted position where the crab claw held in said jaws is spaced from said cutting blade and a scoring position where said cutting blade engages the crab claw shell and makes a cut therein;
depth gauge means including a camming surface which is slidably engaged by the outer surface of the crab claw held by said jaws and is located relative to the cutting edge of said cutting blade, so that when said frame is pivoted to said scoring position and said jaws are being driven by said motor, the outer surface of the crab claw rotatably rides against said camming surface and a continuous circumferential cut is made through the crab claw shell by said cutting blade; and switch means operatively connected to said motor and operable, in response to pivotal movement of said frame between said retracted and scoring positions, to de-energize said motor as said frame is pivoted from said scoring position toward said retracted position and to energize said motor as said frame is pivoted from said scoring position toward said retracted position.

15. An apparatus according to claim 14 including
actuator rod means slidably carried by said spindle for axial movement relative to said spindle;

means pivotally mounting said jaws on said actuator rod means so that, in response to axial movement of said actuator rod means relative to said spindle in one direction, said jaws are moved toward said open position and, in response to axial movement of said actuator rod means relative to said spindle in the opposite direction, said jaws are moved to said closed position; and spring means carried by said spindle for urging said actuator rod means in said opposite direction.

16. An apparatus according to claim 15 including
a handle pivotally supported from said frame for movement relative to said actuator rod means between a loading position where said handle operatively engages said actuator rod means and moves said actuator rod means axially in said one direction against the biasing force of said spring means to thereby move said jaws to said open position and a clamping position where said actuator rod means is free to be moved axially in said opposite direction by said spring means to thereby move said jaws toward said closed position.

17. An apparatus according to claim 16 including
means for weight balancing said frame relative to said pivot axis so that the crab claw held in said jaws is lightly biased by gravity into engagement with said camming surface when said frame is in said scoring position.

* * * * *